United States Patent
Leshinsky et al.

(10) Patent No.: US 10,372,926 B1
(45) Date of Patent: Aug. 6, 2019

(54) PASSIVE DISTRIBUTION OF ENCRYPTION KEYS FOR DISTRIBUTED DATA STORES

(71) Applicant: Amazon Technologies, Inc., Seattle, WA (US)

(72) Inventors: Yan Valerie Leshinsky, Kirkland, WA (US); Lon Lundgren, Kirkland, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 398 days.

(21) Appl. No.: 14/977,464

(22) Filed: Dec. 21, 2015

(51) Int. Cl.
*G06F 21/62* (2013.01)
*H04L 9/08* (2006.01)

(52) U.S. Cl.
CPC .......... *G06F 21/6218* (2013.01); *H04L 9/083* (2013.01); *H04L 9/0822* (2013.01); *H04L 9/0861* (2013.01)

(58) Field of Classification Search
CPC . G06F 21/6218; H04L 9/0822; H04L 9/0894; H04L 9/0886; H04L 63/042
See application file for complete search history.

(56) References Cited

U.S. PATENT DOCUMENTS

| | | | |
|---|---|---|---|
| 5,093,860 A | 3/1992 | Steinbrenner et al. | |
| 6,229,894 B1 * | 5/2001 | Van Oorschot | G06F 21/6209 709/229 |
| 6,307,936 B1 * | 10/2001 | Ober | G06F 8/60 380/277 |
| 6,834,112 B1 | 12/2004 | Brickell | |
| 7,024,553 B1 * | 4/2006 | Morimoto | H04L 9/083 380/273 |
| 7,325,097 B1 * | 1/2008 | Darcy | G06F 3/0622 709/208 |
| 8,447,990 B2 | 5/2013 | Utin | |
| 9,680,805 B1 * | 6/2017 | Rodgers | H04L 63/061 |
| 2001/0002485 A1 * | 5/2001 | Bisbee | G06Q 20/00 713/167 |
| 2002/0150097 A1 | 10/2002 | Yen et al. | |
| 2002/0157016 A1 | 10/2002 | Russell et al. | |
| 2004/0025058 A1 * | 2/2004 | Kuriya | G06F 21/10 726/29 |
| 2004/0190721 A1 | 9/2004 | Barrett et al. | |
| 2005/0114686 A1 * | 5/2005 | Ball | G06F 21/78 713/193 |

(Continued)

*Primary Examiner* — Eleni A Shiferaw
*Assistant Examiner* — Sher A Khan
(74) *Attorney, Agent, or Firm* — Robert C. Kowert; Meyertons, Hood, Kivlin, Kowert & Goetzel, P.C.

(57) ABSTRACT

A distributed data store may implement passive distribution encryption keys to enable access to encrypted data stored in the distributed data store. Keys to encrypt a data volume stored in the distributed data store may be encrypted according to a distribution key and provided to a client of the distributed data store. Storage nodes that maintain portions of the data volume may receive the encrypted key from a client to enable access to the data volume. The storage nodes may decrypt the key according to the distribution key and enable access to the data volume at the storage nodes. In to some embodiments, a key hierarchy may be implemented to encrypt the keys that provide access to the encrypted data. The key hierarchy may include a user key.

19 Claims, 13 Drawing Sheets

(56) References Cited

U.S. PATENT DOCUMENTS

| | | | |
|---|---|---|---|
| 2005/0154872 A1* | 7/2005 | McGrew | H04L 63/0435 |
| | | | 713/150 |
| 2006/0123250 A1 | 6/2006 | Maheshwari et al. | |
| 2009/0316909 A1* | 12/2009 | Futa | H04L 9/083 |
| | | | 380/279 |
| 2011/0022856 A1* | 1/2011 | Ureche | G06F 21/602 |
| | | | 713/193 |
| 2011/0311055 A1* | 12/2011 | Parann-Nissany | G06F 21/602 |
| | | | 380/278 |
| 2012/0297200 A1* | 11/2012 | Thom | G06F 21/57 |
| | | | 713/189 |
| 2012/0297201 A1* | 11/2012 | Matsuda | G06F 21/6245 |
| | | | 713/189 |
| 2013/0007464 A1* | 1/2013 | Madden | G06F 21/6218 |
| | | | 713/179 |
| 2013/0254536 A1* | 9/2013 | Glover | G06F 21/6209 |
| | | | 713/165 |
| 2015/0067330 A1* | 3/2015 | Khan | H04L 9/3013 |
| | | | 713/168 |
| 2016/0065549 A1* | 3/2016 | Roth | H04L 9/3247 |
| | | | 713/170 |
| 2016/0342532 A1* | 11/2016 | Peacock | G06F 12/1408 |
| 2017/0093563 A1* | 3/2017 | Gazit | H04L 9/083 |

* cited by examiner

US 10,372,926 B1

PASSIVE DISTRIBUTION OF ENCRYPTION KEYS FOR DISTRIBUTED DATA STORES

BACKGROUND

Data storage systems implement encryption to prevent unauthorized access to data stored within. The implementation of data encryption may vary from one data storage system to another. For example, some data storage systems may encrypt all data according to a same encryption scheme. The same access credential or encryption key may be used to access any of the data stored in the storage system. However, in some scenarios, it may not be desirable to protect all data stored in a data storage system in the same manner. Instead, different portions of the data may be encrypted differently. For instance, different data objects, such as data folders, files, records, or volumes of data may be encrypted according to different encryption schemes. In this way, different access privileges to different data may be provided and potential compromise of data to unauthorized access may be limited to those data objects for which the encryption key has been compromised.

Managing multiple encryption schemes in data storage systems can prove complex. Distributed storage systems, for instance, may store different copies, parts, or versions of a data object in many different locations. Each of these locations may need to implement similar access controls in order to provide consistent access privileges to the data object. To do this, distribution techniques may be implemented to ensure that the appropriate credentials, such as keys, are provided to the different locations for accessing the data object. In large distributed data storage systems, the number of different data items utilizing different encryption schemes as well as the number of locations in which such data items may be distributed can create a substantial workload for the distributed data storage system to ensure that the proper encryption keys are distributed, reducing the availability of resources to perform other distributed data storage system tasks, such as responding to client requests.

Figure 1:
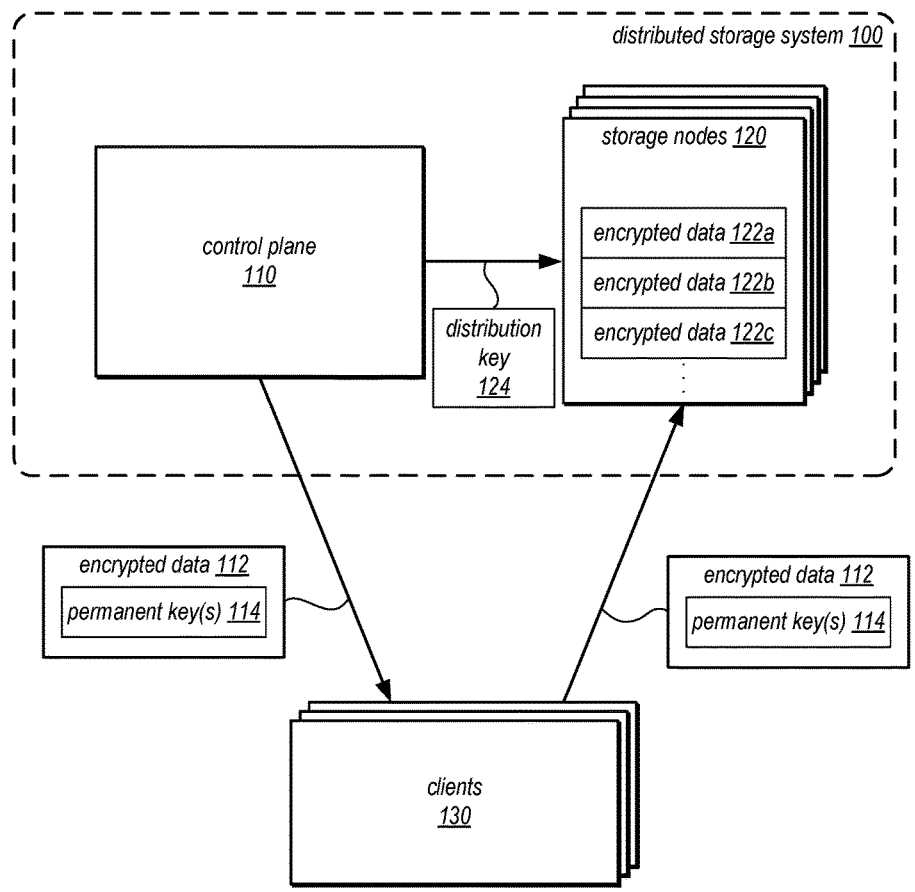
FIG. 1 is a logical block diagram illustrating passive distribution of encryption keys for a distributed storage system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of passive distribution of encryption keys for distributed data stores are described herein. A distributed data store may provide storage for various storage clients. These storage clients may include many different types of applications or services which rely upon the distributed data store to provide reliable and consistent access to stored data (which may be referred to herein as a "data volume"). For example, a database system, such as described below with regard to FIGS. 2-9 may utilize a distributed data store as the backend storage for a database. Data volumes may be stored in distributed fashion across multiple locations within the distributed data store, taking advantage of the capability to scale the number of storage locations to increase or decrease storage and/or processing resources as needed.

According to the needs of applications and services that rely upon the distributed data store, it may be desirable to store encrypted data volumes. An encrypted data volume may be an encoded version of the content of the data volumes that only allows authorized entities to decode the data volume and access the content of the data volumes. Various types of encryption schemes exist, many of which utilize "keys" that are used to authorize the encryption or decryption of data. Symmetric-key schemes, for instance, are implemented so that an encrypting entity and decrypting entity utilize the same key (or a transformation of or derivation from the same key) in conjunction with an encryption algorithm (e.g., stream or block ciphers) to encrypt and decrypt data. Public-key encryption schemes are another example of encryption which may be implemented, utilizing a public key to encrypt data in conjunction with an encryption algorithm and a different private key to decrypt the data in conjunction with the encryption algorithm.

Utilizing encryption techniques, such as the ones described above, data volumes may be encrypted and stored in distributed data stores across different locations in encrypted form, preventing access to data stored at any one of the storage locations without a key to access the data of the data volume stored therein. While clients of a distributed data store could provide data to the distributed data store for storage as part of a data volume in encrypted form, so that encryption is transparent to the distributed data store, the distributed data store would be unable to access the data to perform various management operations. For instance, in log-structured data stores, various techniques to compact or remove log records, derive values from previously stored log records, or otherwise process access requests to a data volume may rely upon access to the unencrypted version of the data to perform different operations. Consider a read request to retrieve a data value. Multiple log records describing changes to the data value may have to be read in order to determine the current value of the data value to return in response to the read request. Instead of relying upon the transparent encryption model, distributed data stores may implement encryption techniques for data volumes that would allow different storage operations that access the underlying data to be performed.

Providing encryption at distributed data stores is not without challenges. Care may be taken to ensure that clients retain ultimate access authority over encrypted data in data volumes and would have the capability of prevent further access, even to operators of the data store. For example, a distributed data store may have to periodically renew access rights with a client by obtaining a key to decrypt a data volume stored for the client. In addition to maintaining client control over data volume access, distributed data stores may implement various redundancy and/or consistency schemes to ensure that data is reliably stored. For example, replica groups storing the same portions of some or all of a data volume may be implemented so that if a single copy of the portion of the data volume is lost, other remaining copies are still available. New copies may be created to add to the replica group such that the membership of replica groups may change over time. As multiple copies of the portion of the data volume are maintained in replica groups, keys for encryption/decryption may need to be distributed to each of the different locations in the replica groups. When replica group membership changes, keys may need to be provided to new replica group members. Moreover, in multi-tenant implementations different storage locations (e.g., such as the storage nodes discussed below) may host different portions of many different data volumes (e.g., 1 storage node may portions of hundreds of different data volumes), which would further tax key distribution from a single source. Large scale events, for instance, that would necessitate distributing large numbers of keys to the different locations could potentially overwhelm key distribution mechanisms that provide a single source for distributing the appropriate keys to different storage locations.

Passive distribution of encryption keys for distributed data stores may provide an efficient distribution mechanism that allows clients attempting to access data volumes to distribute keys to storage locations on-demand, as the keys are needed at the locations to provide access. FIG. 1 is a logical block diagram illustrating passive distribution of encryption keys for a distributed storage system, according to some embodiments. Distributed storage system 100 may provide data storage to store data volumes or any other data objects on behalf of clients 130. Distributed storage system 100 may include control plane 110 and multiple storage nodes 120. Control plane 110 may perform various management operations for distributed data store including, but not limited to, operations to handle requests to create data volumes, allocate storage nodes for data volumes, monitor the health of storage nodes, maintain metadata and/or tracking information for data volumes and/or storage nodes, migrate data volumes, and/or delete data volumes. In various embodiments, control plane 110 may manage and/or distribute keys to encrypt or decrypt data volumes stored on storage nodes. Control plane 110 may be implemented by one or more computing devices, such as computing system 2000 described below with regard to FIG. 13.

Data volumes may be stored in distributed storage system in encrypted form. For instance, when data is received for storage the data may be encrypted according to a symmetric encryption key particular to the data volume to which the data belongs. To access the data at any later time, the same encryption key may then be used to decrypt the data. In at least some embodiments, the encryption scheme applied to data volumes may be permanent so that the encryption scheme of the data is not changed at a later time. Correspondingly, the key to access the permanently encrypted data may be permanent. Permanent encryption schemes may be determined in several ways, such as a key hierarchy discussed below with regard to FIG. 7, where a user supplied key (e.g., from a client 130) is used to encrypt other permanent keys (which correspond to permanent encryption schemes applied to data volumes).

Storage nodes 120 may host data for the data volumes stored in distributed storage system 100 (e.g., according to the various configurations discussed below with regard to FIG. 6) and may be implemented by one or more computing devices, such as computing system 2000 described below with regard to FIG. 13. For example groups of storage nodes, which may be referred to as replica groups or protection groups, may store a similar portion of a data volume at each storage node in the group. As storage nodes fail or unhealthy storage nodes are replaced, new storage nodes may be added to the group. In at least some embodiments, storage nodes may be multi-tenant storage hosts storing portions of data for many different data volumes stored on behalf of many different clients/users/accounts (which may be unaware of and unable to access data collocated at a same storage node). For example, as illustrated in FIG. 1, storage nodes 120 may host encrypted data 122a, 122b, 122c, and so on. Storage nodes 120 may perform various operations to access stored data in order to service client requests and/or manage stored data. For example, in at least some embodiments, distributed storage system 100 may be a log-structured data store, storing log records to describe changes to data as part of a log. To service a read request for particular data, a storage node may be configured to read multiple log records describing changes to the particular data, apply them, and return the result to a requesting client. In order to read the log records, the storage node may require access to the data which may be encrypted. In another example, storage nodes 120 may perform coalesce or compaction operations, which read data and combine and/or move data (e.g., in order to reclaim storage space or reduce the amount of data to be read when servicing an access request). Thus, storage nodes 120 may need to have the corresponding encryption key(s) for the data volumes and/or portions of data volumes which are hosted at the data volumes.

In order to provide the appropriate keys to storage nodes 120, control plane 110 may provide the permanent key(s) 114 specific to particular data volume to clients who wish to access the particular data volume. In at least some embodiments, control plane 110 may determine whether a client has authorization to access the particular data volume. Authorization may be determined in various ways in which a client provides an indication of identity to control plane 110 (e.g., username/password, access token, etc.) which control plane 110 then verifies. Control plane 110 may encrypt permanent keys to be sent as part of encrypted data 112 to clients 130. Clients 130 may not be sent or have access to the distribution key to decrypt encrypted data 112. Instead, clients 130 may maintain encrypted data 112 and forward it on to the appropriate storage nodes when desirable. The encryption scheme used to encrypt permanent key(s) 114 as part of encrypted data 112 may be impermanent in some embodiments. For example, a rotating or changing encryption scheme may be utilized to encrypt data 112, as discussed below with regard to FIGS. 7-10. By distributing permanent key(s) 114 to clients 130 may send the encrypted data 112 including the appropriate permanent key(s) 114 to a particular storage node hosting at least a portion of the particular data volume to enable access to the data volume when enabling access is desired by a client. Thus, permanent keys may be provided to storage nodes 120 lazily, when needed. Moreover, in embodiments where storage nodes 120 are added to replica or protection groups, the permanent key(s) 114 may be provided when clients 130 communicate with the additional storage nodes 120.

Storage nodes 120 may maintain distribution key 124 to decrypt encrypted data 112 to access permanent keys 114. Storage nodes 120 may obtain distribution key 124 from control plane 110. However, in at least some embodiments, distribution key 124 may not be specific to a particular data volume and thus may be used to decrypt encrypted data 112 from multiple clients 130 which respectively include different permanent key(s) 114 for different data volumes. In this way, costs to send distribution key 124 from control plane 110 to storage nodes 120 may be significantly less than distributing permanent key(s) 114. Storage nodes 120 may, in some embodiments, maintain distribution 124 and permanent key(s) 114 in memory so that if a storage device (e.g., a hard disk drive) where removed from a storage node (e.g., without authorization), the keys to access the data are not stored on the storage device itself. Distribution key 124 may be changed, as noted above, triggering the deletion of all keys maintained at storage nodes 120. Once deleted, storage nodes 120 may require another copy of permanent key(s) 114 to be obtained for each data volume hosted by a storage node 120 from clients 130, who receive new encrypted data with the permanent key(s) 114 which can be decrypted by a new distribution key.

Passive distribution of keys prevents key management sources, such as control plane 110, from being overwhelmed with requests to obtain keys by storage nodes. Consider a failure event where a large number of storage nodes 120 fail. If keys where directly obtained, instead of passively obtained, storage nodes 120 may overwhelm control plane 110 with requests for keys (which may be redundant where multiple copies of data volumes are maintained at storage nodes). Moreover, storage nodes 120 may receive keys from a source external to distributed storage system 100, which may not necessarily be trusted. However, as the permanent key(s) 114 are encrypted, storage nodes 130 may trust validity of permanent key(s) 114.

Please note, FIG. 1 is provided as a logical illustration of a distributed data store providing passive distribution of encryption keys, and is not intended to be limiting as to the physical arrangement, size, or number of components, modules, or devices, implementing a distributed data store or client.

The specification first describes an example of a distributed data store as a distributed storage service which may implement passive distribution of encryption keys, according to various embodiments. The example distributed storage service may store data for many different types of clients, in various embodiments. One such client may be a network-based database service, described in further detail below. Included in the description of the example network-based database service are various aspects of the example network-based database service along with the various interactions between the database service and the distributed storage service. The specification then describes a flowchart of various embodiments of methods for providing passive distribution of encryption keys for a distributed data store. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. If, therefore, the database is encrypted, then keys to decrypt and access data may need to be distributed utilizing passive distribution techniques (as discussed with regard to FIG. 1 above). For example, in some embodiments, rather than the database engine applying changes to a database (or data pages thereof) and then sending the modified data pages to the storage layer, the application of changes to the stored database (and data pages thereof) may be the responsibility of the storage layer itself, which may need to decrypt stored data to apply changes and rewrite an encrypted version with of the modified data pages. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of TOPS associated with it. When a volume is created, it may be created with a specific size, with a specific availability/durability characteristic (e.g., specifying how it is replicated), with an IOPS rate associated with it (e.g., both peak and sustained), and/or user specified encryption. For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. The volume metadata may indicate which protection groups, and their respective storage nodes, maintain which partitions of the volume. For example, in some embodiments, in response to a request to make a change to a database, the client-side driver may be configured to determine the protection group, and its one or more nodes that are implementing the storage for the targeted data page, and to route the redo log record(s) specifying that change to those storage nodes. These read and write requests or separate synchronization requests may also include encrypted data which includes keys to decrypt data store of the protection group to which the storage node belongs. The storage nodes may then be responsible for applying the change specified in the redo log record to the targeted data page at some point in the future, including decrypting the received keys and using the received keys to decrypt stored data to apply the change specified in the redo log record. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records. Coalesce operations performed upon data pages may utilize received keys to access encrypted data pages and redo log records at the storage nodes.

As previously noted, in some embodiments, the storage tier of the database system may be responsible for taking database snapshots. However, because the storage tier implements log-to structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing, which again may utilize a received encryption keys. Crash recovery may thereby be made parallel and distributed across nodes.

Figure 2:
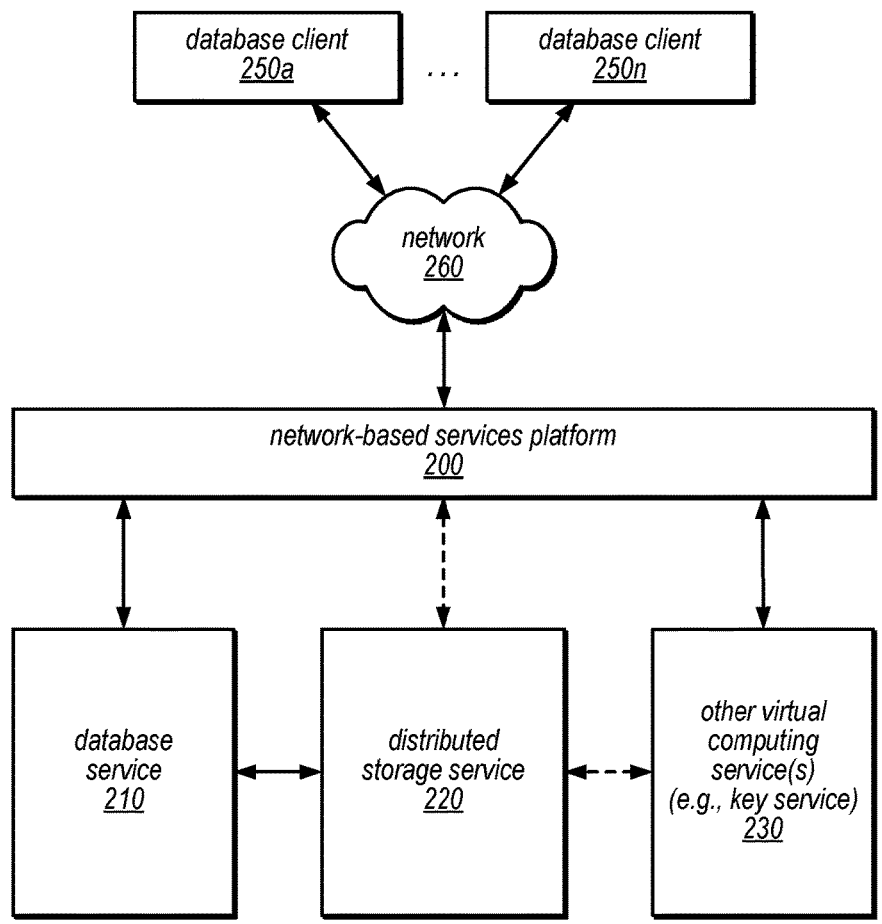
FIG. 2 is a block diagram illustrating a service system architecture that may be configured to implement a network-based database service and a network-based distributed storage service which may utilize passive key distribution to provide access to data stored in the network-based distributed storage service, according to some embodiments.

One embodiment of a service system architecture that may be configured to implement a network-based services-based database service is illustrated in FIG. 2. In the illustrated embodiment, a number of clients (shown as clients 250a-250n) may be configured to interact with a network-based services platform 200 via a network 260. Network-based services platform 200 may be configured to interface with one or more instances of a database service 210, a distributed storage service 220 and/or one or more other virtual computing services 230. Distributed storage service may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 13 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (such as a key service that creates, manages, and applies keys for database clients and other services, such as distributed storage service 220).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250a through 250n, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
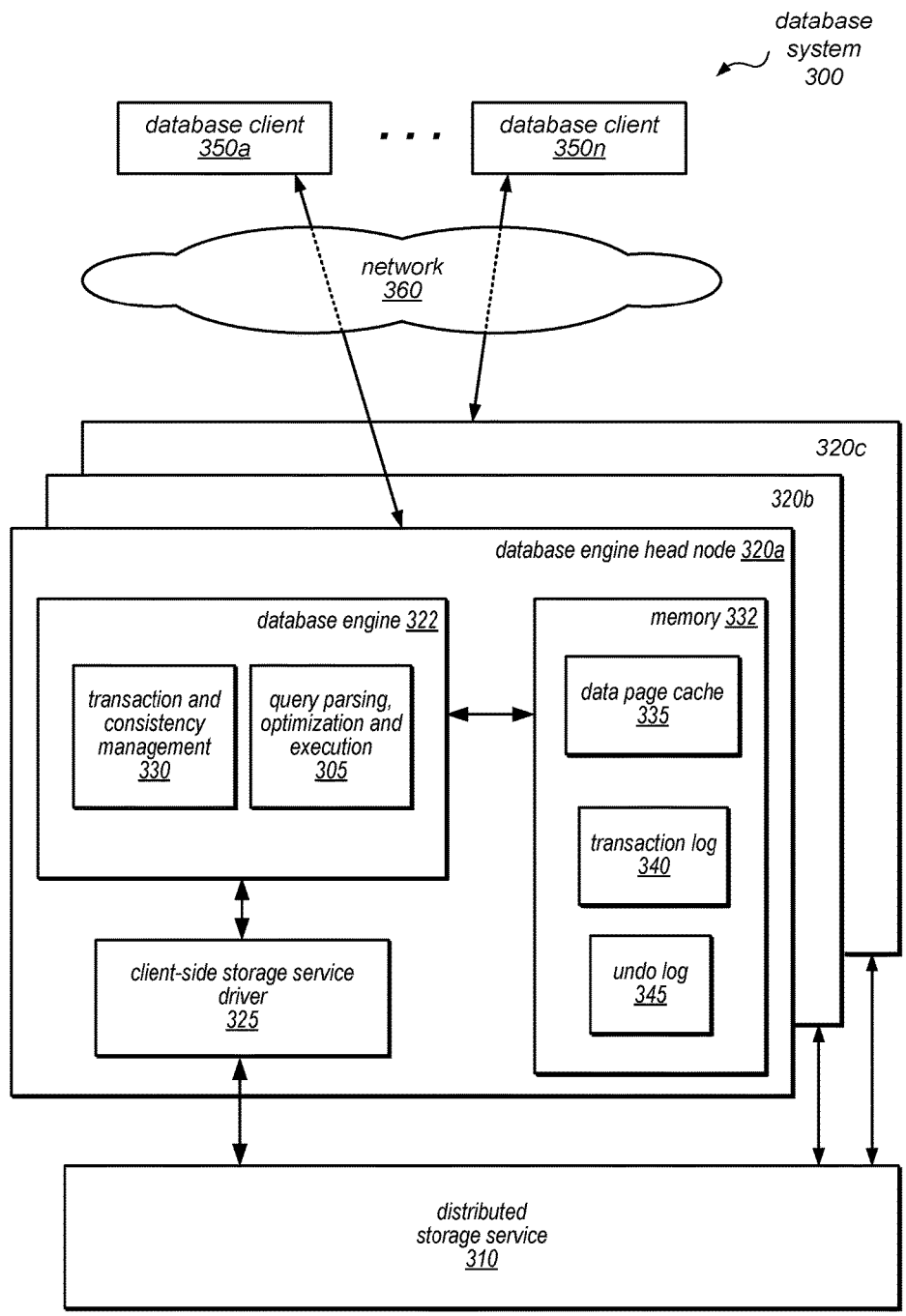
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed storage service 310, which may be employed by the database system to store a database volume (such as data pages of one or more databases, as well as redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a). Client-side storage service driver 325 may maintain mapping information about the database volume stored in distributed storage service 310, such that a particular protection group maintaining a partition of the database volume may be determined. Read requests and redo log records may then be routed to storage nodes that are members of the protection group according to the partition of user data to which the read request is directed or to which the redo log record pertains. Client-side storage service driver 325 may obtain encrypted keys for the different protection groups of a data volume from distributed storage service 310 and provide them to individual storage nodes of the respective protection groups so that the client-side storage service driver sends the key for each protection group to the storage nodes of the protection group when communicating with storage nodes of the protection group.

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed storage systems described herein may organize data in various logical data volumes, extents (which may include partitions of the user data space in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the distributed storage service that together make an extent durable. Multiple segments, each of which lives on a particular one of the storage nodes in a protection group, are used to make the extent durable.

In some embodiments, each data page is stored in a segment, such that each segment stores a collection of one or more data pages and a change log (also referred to as a redo log) (e.g., a log of redo log records) for each data page that it stores. Thus, change logs may be log records segmented to the protection group of which the segment is a member. As described in detail herein, the storage nodes may be configured to receive redo log records (which may also be referred to herein as ULRs) and to coalesce them to create new versions of the corresponding data pages and/or to additional or replacement log records (e.g., lazily and/or in response to a request for a data page or a database crash). If the data volume is encrypted, such a coalesce operation may need to obtain the encryption key to perform the coalesce operation. In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume may be a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)) assigned from a log sequence number space. Each ULR may be persisted to one or more synchronous segments in the log-structured distributed store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment may be a limited-durability unit of storage assigned to a single storage node. Multiple segments may be implemented in a protection group to persist an extent. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page may be a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page may be a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Log records may include metadata, such as pointers or back links, that indicate a previous LSN for log record maintained at a particular segment and/or the previous LSN in the log sequence number space. Control Log Records (CLRs), which are generated by the storage system, may also contain control information used to keep track of metadata such as the current unconditional volume durable LSN (VDL). Null Log Records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record may be the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages may be the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page may be a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node may be a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance. Multiple storage nodes may together implement a protection group, in some embodiments.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
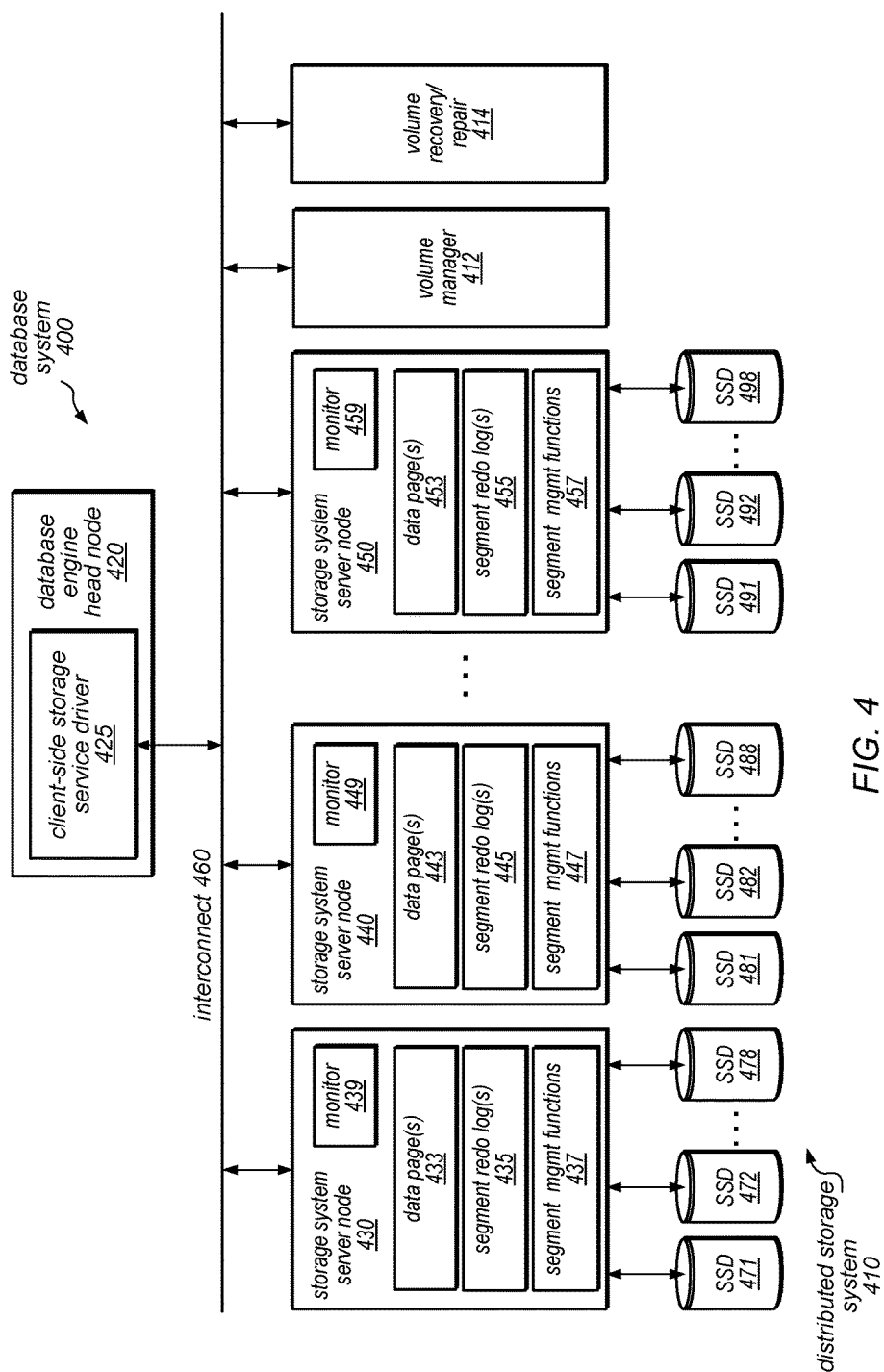
FIG. 4 is a block diagram illustrating a distributed storage system that may implement passive distribution of encryption keys, according to some embodiments.

One embodiment of a distributed storage system is illustrated by the block diagram in FIG. 4. In at least some embodiments, storage nodes 430-450 may store data for different clients as part of a multi-tenant storage service. For example, the various segments discussed above and below with regard to FIG. 6, may correspond to different protection groups and volumes for different clients.

In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). As data may be encrypted, in some embodiments, storage system server nodes may be configured to receive encrypted versions of permanent keys to access the data stored for a data volume, decrypt the encrypted versions of the permanent keys according to another key maintained at the storage system server node (e.g., a distribution key), and maintain the permanent keys in memory (e.g., system memory 2020 in FIG. 13). When performing the above noted operations, a storage node may retrieve the appropriate permanent key to access the data and decrypt/re-encrypt the data as needed. If a storage node receives a request to perform an operation to access for which the storage system server node does not have the permanent key in memory, the storage system server node may send a request for the permanent key to the client that sent the request. Each storage system server node may also have multiple attached storage devices (e.g., SSDs) on which data blocks may be stored on behalf of clients (e.g., users, client applications, and/or database service subscribers). In some embodiments, storage system server nodes may provide multi-tenant storage, storing portions of different data volumes for different clients in the attached storage devices. Correspondingly, storage system server nodes may maintain numerous permanent keys for the different data volumes.

In the example illustrated in FIG. 4, storage system server node 430 includes data page(s) 433, segment redo log(s) 435, segment management functions 437, monitor 449 and attached SSDs 471-478. Monitor 439 may report health statistics, performance measurements and any other information to volume manager 412 for distributed storage system management. In at least some embodiments, monitor 439 may periodically poll for a new distribution key from volume manager 412 to use for decrypting permanent keys received from clients. If monitor 439 receives a new distribution key, all other keys maintained in memory may be deleted so that storage system server node 430 may need to obtain the permanent keys again from each client that desires to enable access to a data volume at the storage system server node. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Figure 8:
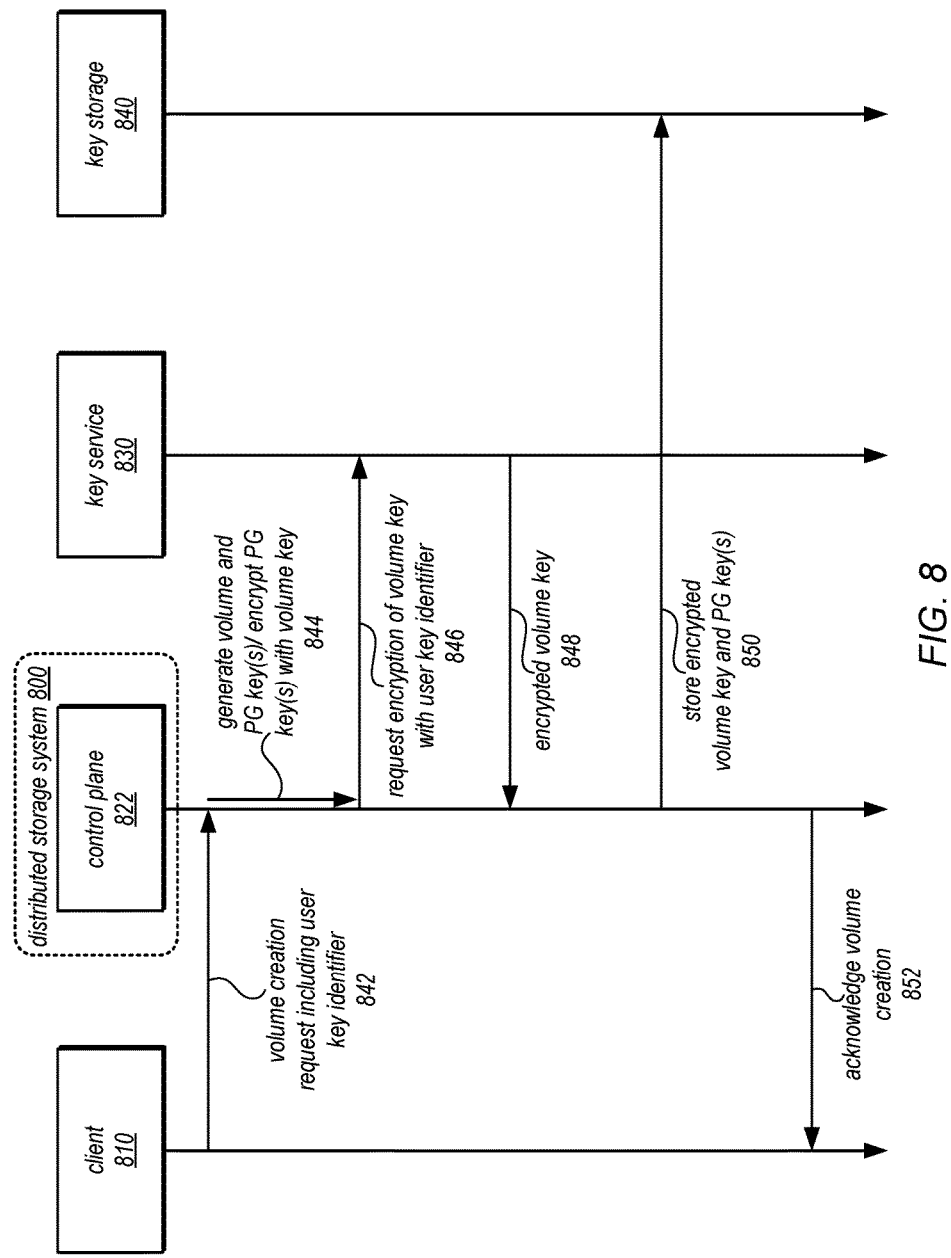
FIG. 8 is a diagram illustrating interactions between a client and a distributed storage system to establish encryption for a data volume stored in the distributed storage system, according to some embodiments.
Figure 9:
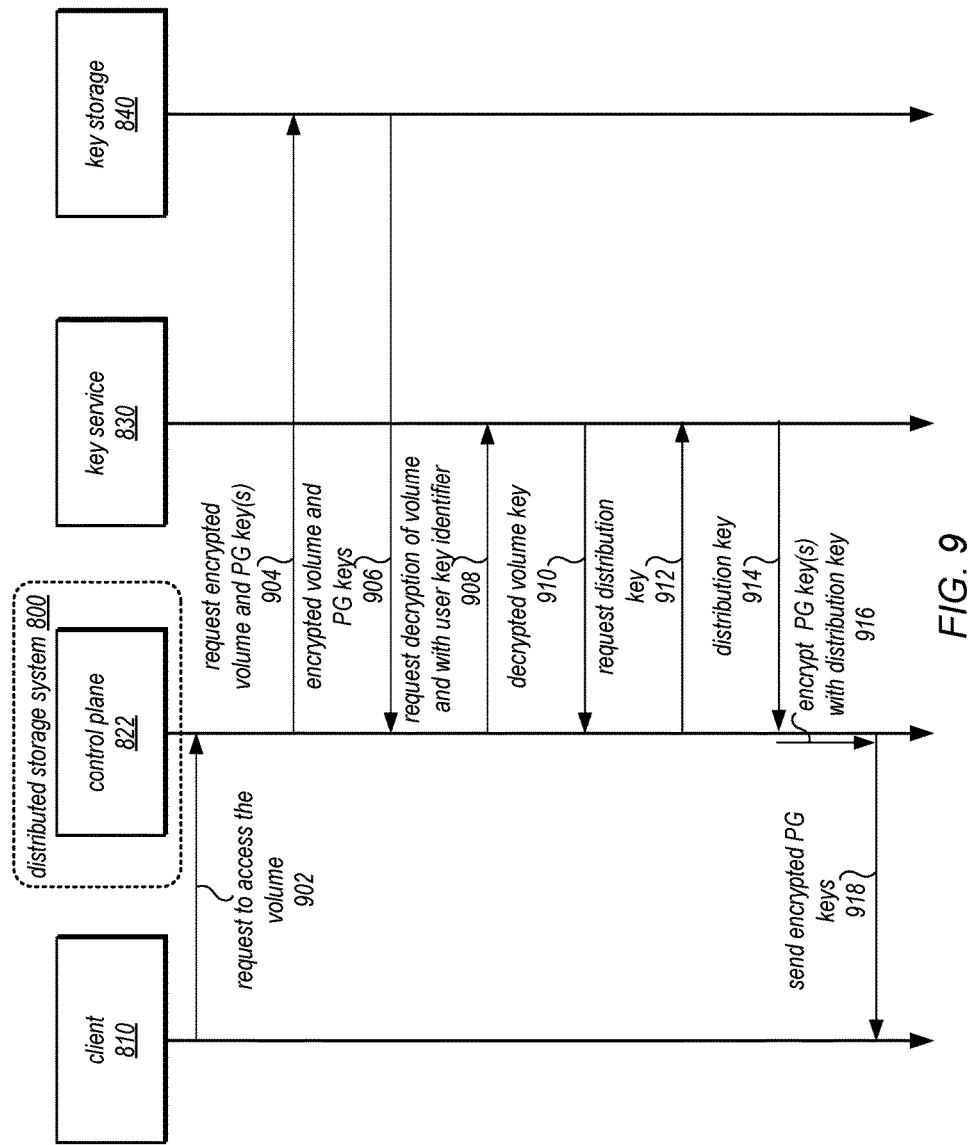
FIG. 9 is a diagram illustrating interactions between a client and a distributed storage system to obtain encrypted keys for accessing a data volume, according to some embodiments.
Figure 11:
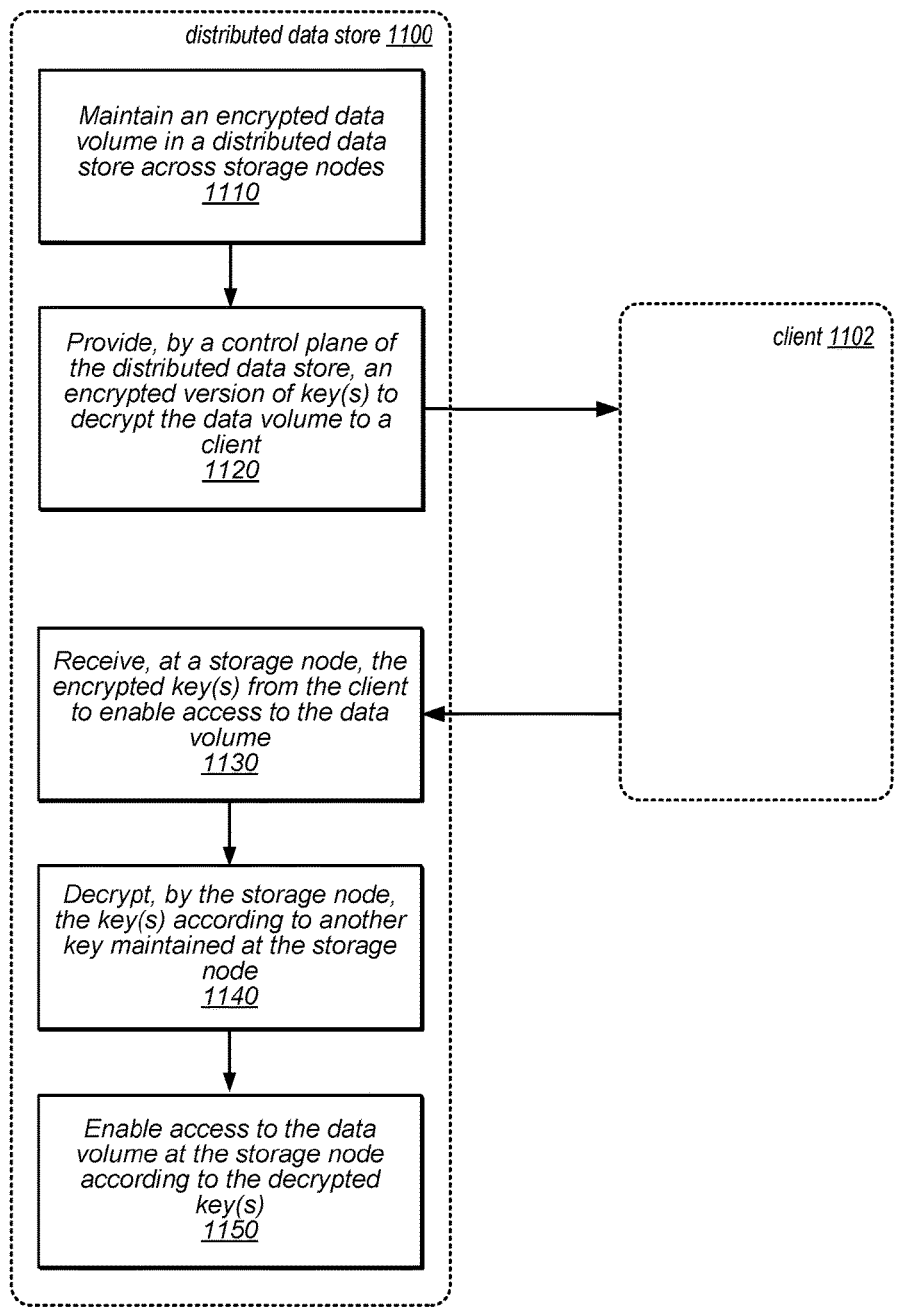
FIG. 11 is a high-level flowchart illustrating various methods and techniques to implement passive distribution of encryption keys for a distributed data store, according to some embodiments.

Distributed storage system 410 may also implement a storage control plane. Storage control plane may be one or more compute nodes configured to perform a variety of different storage system management functions. For example, storage control plane may implement a volume manager 412, which may be configured to maintain mapping information or other metadata for a volume, such as current volume state, current writer, truncation tables or other truncation information, or any other information for a volume as it is persisted in varying different, extents, segments, and protection groups. Volume manager 412 may be configured to communicate with a client of storage system 410, such as client-side driver 425 in order to "mount" or "open" the volume for the client, providing client-side driver 425 with mapping information, protection group policies, and various other information necessary to send write and read requests to storage nodes 430-450. For example, in at least some embodiments, volume manager 412 may provide key management (or facilitate access to keys managed by another service, such as a key management and/or key storage service.) FIGS. 8-9 and 11, which are discussed below, provide various examples of passive distribution of keys that volume manager 412 may be configured to perform. Volume manager 412 may be configured to provide the maintained information, including keys, to storage clients, such as database engine head node 420 or client-side driver 425 or to other system components such as recovery service agents implemented for volume recovery/repair service 414. For example, volume manager 412 may provide a current volume state (e.g., clean, dirty or recovery), current epoch indicator and/or any other information about the data volume.

In some embodiments, distributed storage system may implement volume recovery/repair service 414. Volume recovery/repair service 414 may be configured to monitor or evaluate the current data volume state and based, at least in part, on the evaluation, direct recovery service agent(s) to perform a recovery operation with respect to a data volume. For example, volume recovery/repair 414 service may determine that the state of a particular data volume has remained in recovery state in excess of a time threshold and, in response direct one or more recovery service agent(s) to perform a recovery operation for the data volume.

In some embodiments, volume recovery/repair 414 may detect recovery events for a data volume. For example, volume recovery/repair 414 may receive an indication from client-side storage service driver 425 or database engine head node 420 that the data volume may not be re-opened or used again by a writing client. Additionally, recovery event detection module may determine other recovery events that may include detecting that a lease has expired for data volume client-side storage service driver 425 or database engine head node 420, or may receive a release request or command to evict the database engine head node 420 from another component of the database service 400. More generally, volume recovery/repair 414 may detect any event which may trigger or require the performance of a recovery operation.

Volume recovery/repair 414 may also implement recovery service agent(s) (not illustrated) which may be individual or collections of computing systems, nodes or devices that are configured to perform recovery operations. Recovery service agent(s) may be provisioned (from other computing resources of distributed storage system 410 or another system of network-based service platform 200 in FIG. 2) or directed to perform a recovery operation by volume recovery/repair 414. Recovery service agent(s) may abort the performance of a recovery operation, if it is determined that a recovery operation for the same data volume is already complete. In order to repair data volumes, may need to enable access to encrypted data for the data stored at the different storage nodes. Thus, similar to client-side storage service driver 425, recovery service agent(s) may receive an encrypted version of permanent key(s) to a data volume and send them to those storage nodes storing the data volume. Thus in the discussion regarding FIGS. 7-12, recovery agent(s) may be considered a client of the distributed data store.

Figure 5:
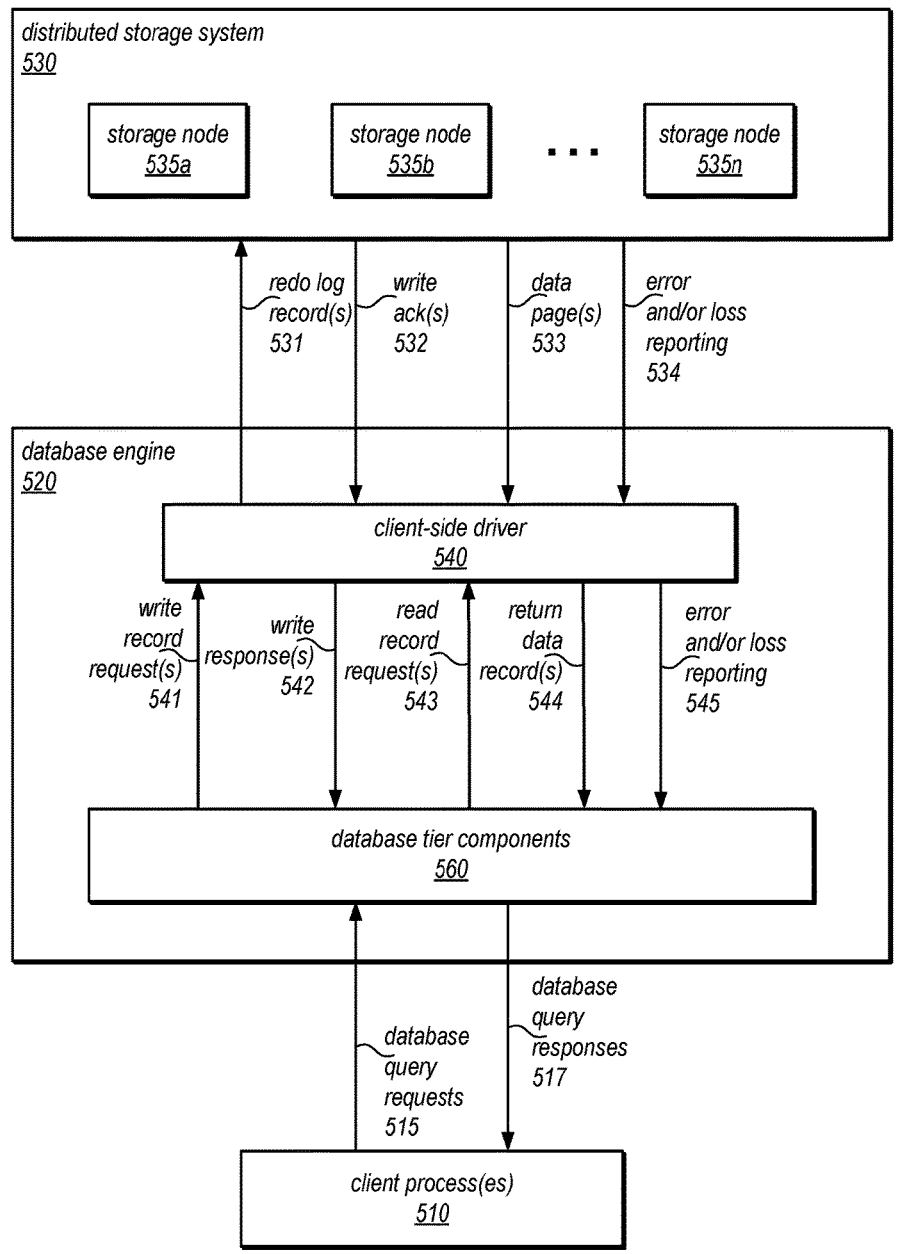
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3). In various embodiments, database engine 520 may have obtained a volume epoch indicator or other identifier from distributed storage system 530 granting access writes to a particular data volume, such as by sending a request to open the data volume to distributed storage system 530.

In this example, one or more client processes 510 may send database query requests 515 (which may include read and/or write requests targeting data stored on one or more of the storage nodes 535*a*-535*n*) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of specific protection groups storing the partition user data of user data space to which the write record request pertains in distributed storage system 530. Client-side driver 540 may generate metadata for each of the redo log records that includes an indication of a previous log sequence number of a log record maintained at the specific protection group. Distributed storage system 530 may return a corresponding write acknowledgement(s) 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535*a*-535*n*, each of which may have multiple attached SSDs. In some embodiments, distributed storage system 530 may provide high durability for stored data block through the application of various types of redundancy schemes.

As noted above, in some embodiments, the functional components of a database system may be partitioned between those that are performed by the database engine and those that are performed in a separate, distributed storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Figure 6:
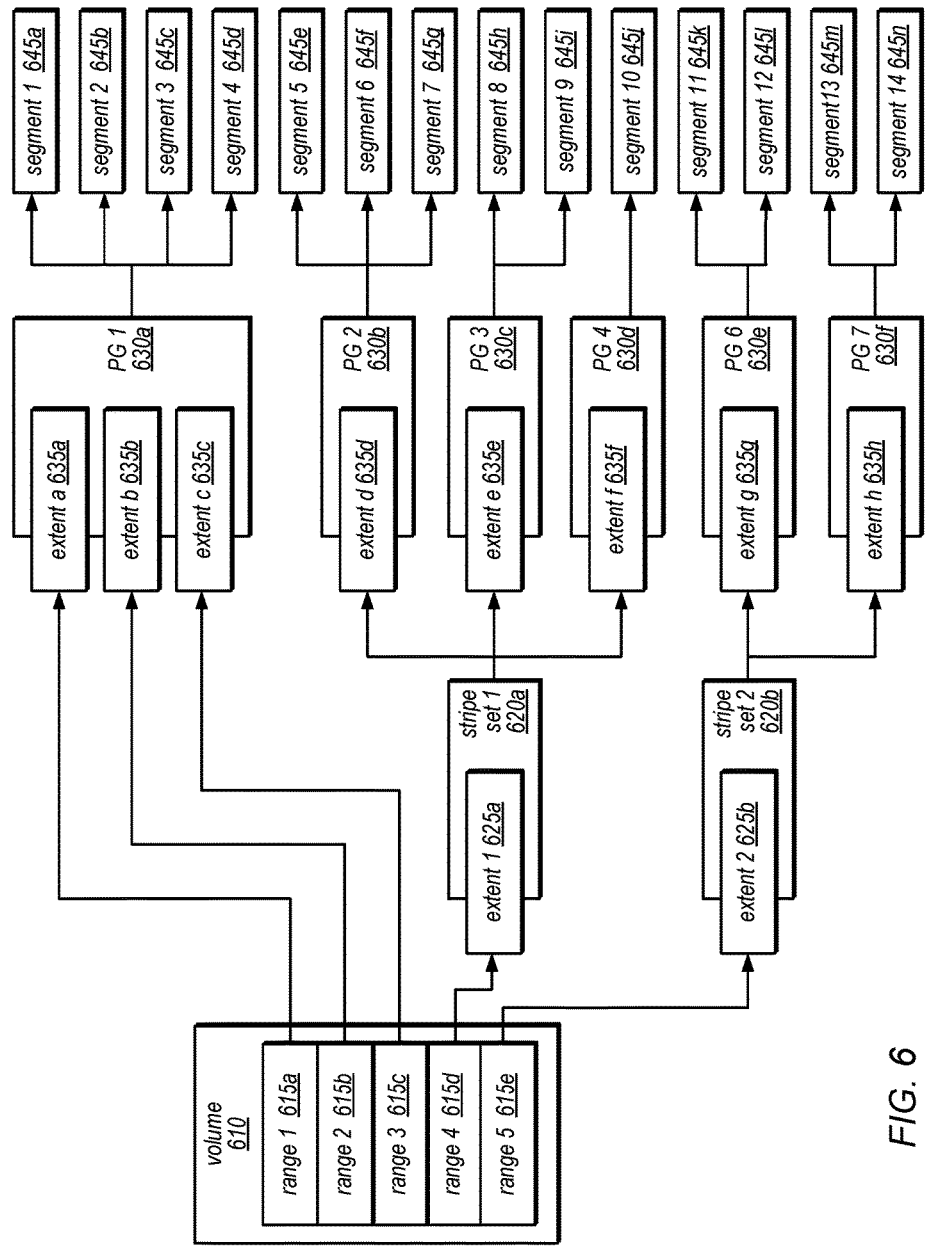
FIG. 6 is a block diagram illustrating an example configuration of a data volume, according to some embodiments.

FIG. 6 is a block diagram illustrating an example configuration of a data volume 610, according to one embodiment. In this example, data corresponding to each of various address ranges 615 (shown as address ranges 615a-615e) is stored as different segments 645 (shown as segments 645a-645n). More specifically, data corresponding to each of various address ranges 913 may be organized into different extents (shown as extents 625a-625b, and extents 635a-635h), and various ones of these extents may be included in different protection groups 630 (shown as 630a-930b), with or without striping (such as that shown as stripe set 620a and stripe set 620b). In this example, protection group 1 illustrates the use of erasure coding. In this example, protection groups 2 and 3 and protection groups 6 and 7 represent mirrored data sets of each other, while protection group 4 represents a single-instance (non-redundant) data set. Protection groups may be implemented as multi-tier protection groups.

More specifically, in this example, protection group 1 (630a) includes extents a-c (635a-635c), which include data from ranges 1-3 (615a-615c), respectively, and these extents are mapped to segments 1-4 (645a-645d). Protection group 2 (630b) includes extent d (635d), which includes data striped from range 4 (615d), and this extent is mapped to segments 5-7 (645e-645g). Similarly, protection group 3 (630c) includes extent e (635e), which includes data striped from range 4 (615d), and is mapped to segments 8-9 (645h-645i); and protection group 4 (630d) includes extent f (635f), which includes data striped from range 4 (613d), and is mapped to segment 10 (645j). In this example, protection group 6 (630e) includes extent g (635g), which includes data striped from range 5 (615e), and is mapped to segments 11-12 (645k-645l); and protection group 7 (630f) includes extent h (935h), which also includes data striped from range 5 (615e), and is mapped to segments 13-14 (645m-645n).

Please note that the striping, erasure coding, and other storage schemes for the database volume apply to the user data space of the database volume, not the log records pertaining to the volume. Log records are segmented across protection groups according to the partition of the volume maintained at the protection group. For example, log records indicating updates to the user data striped from range 5 maintained in PG 6, pertain to the user data in PG 6.

In some embodiments, protection group policies may be implemented. A protection group policy may determine the number of protection group members that may need to be maintained at in a protection group at any time in order to provide a guaranteed level of durability.

For example, a protection group policy may require that a protection group include five storage nodes. If a one or more storage nodes were to fail, then volume recovery/repair service 414 may provision one or more new nodes to bring the number of storage nodes back up to five. Thus, protection group membership may be dynamic, not static. Passive distribution of encryption keys may allow for a database engine head node or other client (e.g., volume recovery/repair service) to provide new storage nodes in a protection group with the key(s) for appropriate for decrypting/encrypting data for the protection group.

Figure 7:
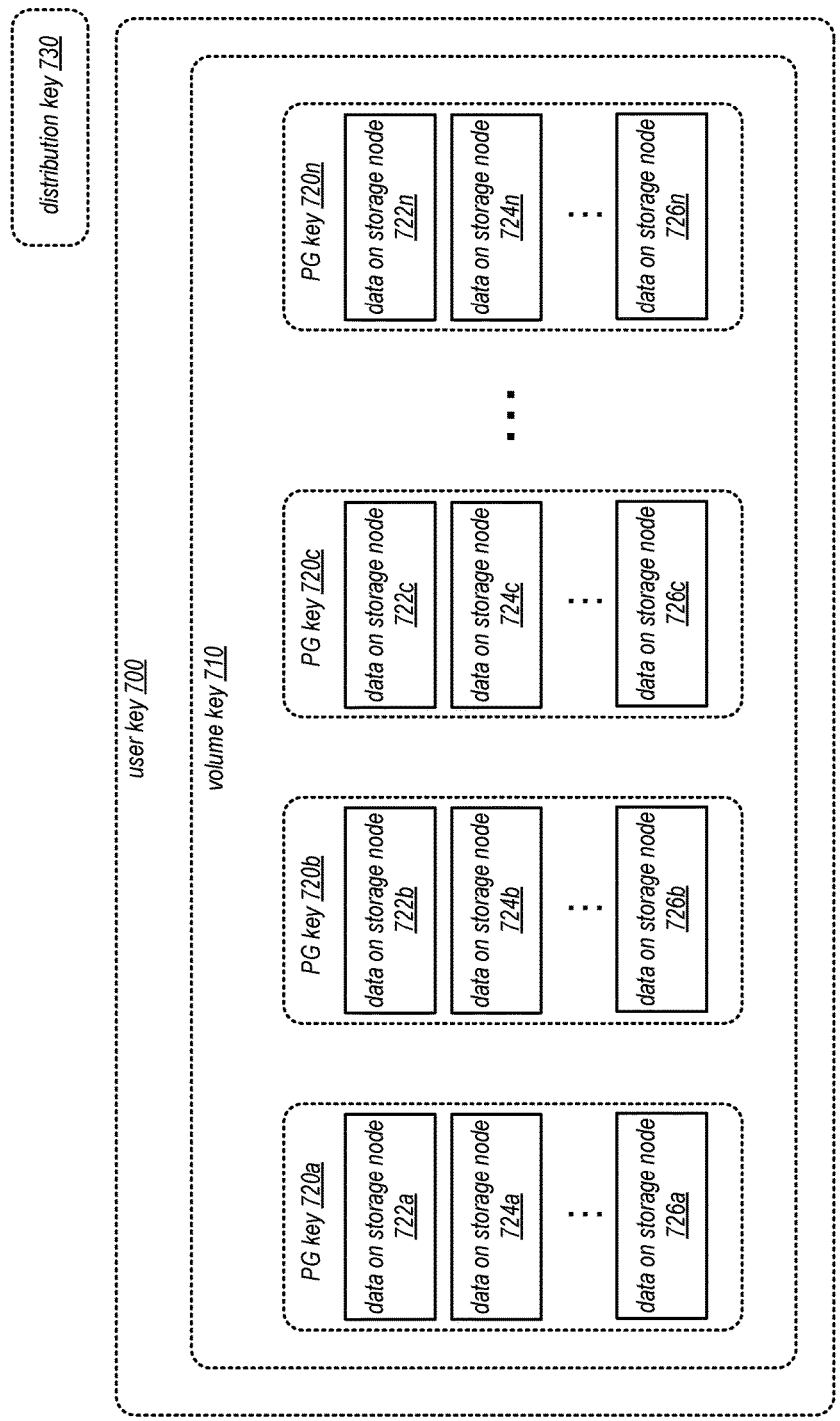
FIG. 7 is a block diagram illustrating an example key hierarchy for a data volume, according to some embodiments.

In some embodiments, a distributed data storage system may allow a user/owner/entity on whose behalf a data volume is stored to control access to the data volume using encryption. A user provided key may be used to encrypt a key hierarchy for the data volume so that the user may change the encryption key at a later time. FIG. 7 is a block diagram illustrating an example key hierarchy for a data volume, according to some embodiments. User key 700 may be a top level key used to encrypt a volume key 710. Without user key 700, volume key 710 may not be accessible. Thus, a user has the capability to permanently block access by not providing user key 700 to a distributed data store. Unlike user key 700, volume key 710 and PG keys 720 may be permanent keys that are not changeable. In this way, a user key 700 or distribution key 730 can be rotated to effectively change encryption without having to decrypt and re-encrypt the underlying data on storage nodes (e.g., 722, 724, and 726).

Figure 10:
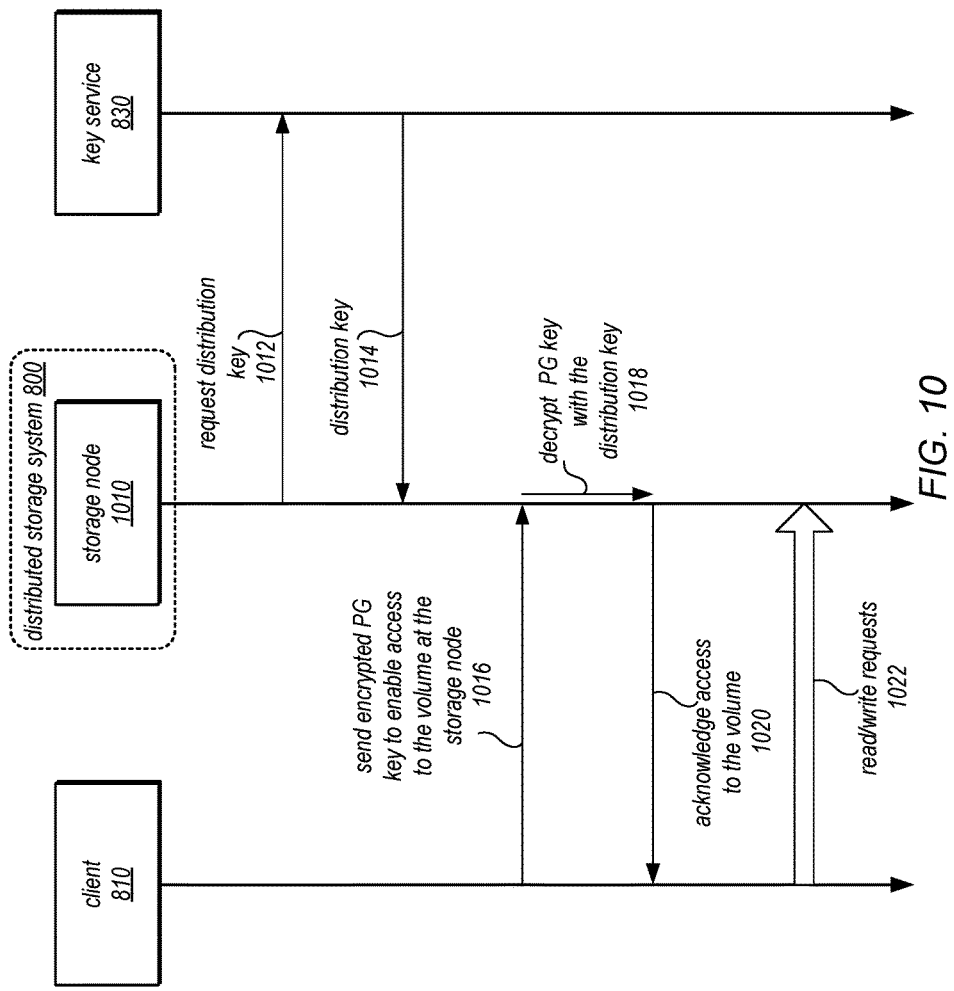
FIG. 10 is a diagram illustrating interactions between a client and a distributed storage system to enable access to a data volume at a storage node of the distributed storage system, according to some embodiments.

Volume key 710 may be used to encrypt/decrypt PG keys 720 so that access to a PG key 720 is blocked without access to volume key 710. PG keys 720 may be keys to encrypt/decrypt data stored on storage nodes. A different key may be provided for each protection group. Thus, PG key 720a may be used to encrypt/decrypt data on storage nodes for a particular protection group, such as data on storage nodes 722a, 724a, and 722n, and may not be used to decrypt data on storage nodes for other protection groups, such as 722b, 724b, 726b, 722c, 724c, 726c, 722n, 724n, and 726n. Distribution key 730 may be used to encrypt/decrypt PG keys 720 for passive distribution to clients to enable access to a data volume. Like user key 710, distribution key 730 can be changed. FIGS. 8-10 discussed below illustrate the interactions to create and utilize the key hierarchy illustrated in FIG. 7. A distribution key may not correspond to an individual data volume or storage node but may instead be utilized for a large number of resources, such as a fleet of storage nodes deployed in particular data center, geographical area, logical grouping, and/or availability zone. Thus one distribution key may, for instance, be used to encrypt different PG keys 720 for different data volumes stored at storage nodes mapped to the one distribution key. In some embodiments, distribution key 730 may be utilized as an envelope key, to encrypt underlying PG keys 720 for passive distribution. In this way, a storage node storing different portions of multiple volumes, requiring multiple different PG keys to access the volumes, may utilize a single distribution key to decrypt the encrypted version of the PG keys sent from clients of the distributed data store.

FIG. 8 is a diagram illustrating interactions between a client and a distributed storage system to establish encryption for a data volume stored in the distributed storage system, according to some embodiments. Distributed storage system 800 may be a distributed data store like the distributed storage system discussed above with regard to FIGS. 2-6, or another type of distributed data store. Client 810 may be a client of distributed data store 800, such as database engine head node, as discussed above with regard to FIGS. 2-6, or any other client to on behalf of which data is stored in distributed storage system 800. To create a data volume with encryption, client 810 may send a volume creation request including a user key identifier 842. Control plane 822 for distributed storage system may receive the request and provision, allocate, and/or perform tasks to prepare a new data volume for storage. Control plane 822 may generate a volume key and PG keys for the data volume and encrypt the PG keys with the volume key, as indicated at 844. Various types of encryption schemes may be implemented, such as the Advanced Encryption Standard (AES), to generated encrypted versions of the PG keys.

In at least some embodiments, a key service 830 may be utilized to manage, encrypt, and decrypt data, such as the volume key generated by control plane 822. Key service 830 may provide centralized control for one or multiple encryption keys. Key service may perform key creation, key rotation, and enforce key usage policies. The keys managed by key service 830 may be stored in highly durable storage in an encrypted format to be retrieved when needed, without being stored in a readable format. Key service 830 can be configured to automatically rotate keys and track older versions of keys in order to decrypt previously encrypted data with an older key. Key service 830 may allow clients to request the creation of new keys and control what entities (including clients or other services) have access to the keys. For example, distributed storage system 800 may be authorized to utilize the encryption key associated the user key identifier included in request 842 so that control plane 822 may send a request to key service 830 to encrypt the volume key with the user key identifier. Key service 830 may encrypt the volume key with a key corresponding to the user key identifier and send the encrypted volume key 848 back to control plane 822. In some embodiments, distributed storage system may utilize another storage service, such as key storage 840 (which may be implemented as another network-based service such as other virtual service 230 in FIG. 2), to store the encrypted volume key and PG key(s) 850. Alternatively, distributed storage system 800 may store encrypted keys using internal resources. Control plane 822 may then acknowledge creation of the data volume 852 to client 810. Note that in some embodiments, key service 830 may be implemented within a client network or service (e.g., one or more on-premise hardware security modules (HSMs)) to encrypt the volume key.

FIG. 9 is a diagram illustrating interactions between a client and a distributed storage system to obtain encrypted keys for accessing a data volume, according to some embodiments. To enable access to a data volume stored in distributed storage system 800, client 810 may request access to the data volume. For example, client 810 may send a request to access the data volume 902 to control plane 822. In response control plane 822 may request the encrypted volume key and PG key(s) 904 from key storage 840. Key storage 840 may return the requested keys 906 to control plane 822. Control plane 822 may then send a request to decrypt the volume key with the user key identifier 908. Key service 830 may access the user key corresponding to the user key identifier and decrypt the volume key and send the decrypted volume key 910 to control plane 822.

In addition to the user, distributed storage system 800 may utilize key service 830 to generate, manage, and rotate distribution keys for the distributed storage system. A distribution key, as discussed above in FIG. 7 may be used to re-encrypt PG key(s) for passive distribution to storage nodes. As illustrated in FIG. 9, control plane 822 may send a request to key service 830 for the distribution key for distributed storage service 800. Key service may provide distribution key 914 to control plane 822. Control plane 822 may then encrypt the PG key(s) for the data volume 916 and send the encrypted PG key(s) 918 to client 810.

FIG. 10 is a diagram illustrating interactions between a client and a distributed storage system to enable access to a data volume at a storage node of the distributed storage system, according to some embodiments. Storage node 1010 storing part of the data volume encrypted according to the keys discussed above in FIGS. 8 and 9 may request 1012 and obtain the distribution key 1014 from key service 830. In general, storage nodes may monitor for distribution key rotations, or receive indications thereof so that when an encrypted key is received from a client, the storage node may be ready to decrypt the key. For example, as indicated at 1016, client 810 may send a request to enable access to the volume at the storage node including the encrypted PG key corresponding to the PG of which the storage node is a member for the data volume. Storage node 1010 may then decrypt the PG key with the obtained distribution key, as indicated at 1018. In at least some embodiments, the decrypted PG key may only be maintained in memory so that the decrypted version of PG keys is not stored in readable form on any persistent storage device attached to the storage node (preventing scenarios that would allow a storage device to be removed and decrypted based on the contents of the storage device). An acknowledgment of enabling access may be sent 1020 to client 810. Thus, client 810 may then being to perform read and write requests 1022 to storage node 1010, and storage node 1010 may perform the access operations upon the encrypted data instigated by the requests 1022. For example, storage node 1010 can store received data for a write request and write it to a storage device in the appropriate encrypted form.

Note that in various embodiments, the requests and responses among different clients, services, other systems, and a distributed storage system, such as those illustrated in FIG. 5 between database engine 520 and distributed storage system 530 (e.g., APIs 531-534) and/or between client-side driver 540 and database tier components 560 (e.g., APIs 541-545), those illustrated in FIG. 8 between client 810 and distributed storage system 800 (e.g., 842 and 852), between distributed storage system 800 and key service 830 (e.g., 846 and 848), and/or between distributed storage system 800 and key storage 840 (e.g., 850), those illustrated in FIG. 9 between client 810 and distributed storage system 800 (e.g., 902 and 918), between distributed storage system 800 and key service 830 (e.g., 908, 910, 912, and 914), and/or between distributed storage system 800 and key storage 840 (e.g., 904 and 906), and/or those illustrated in FIG. 10 between client 810 and storage node 1010 (e.g., 1016, 1020, and 1022), and between storage node 1010 and key service 830 (e.g., 1012 and 1014), may be performed over a secure proxy connection (e.g., one managed by a gateway control plane), or may be performed over the public network or, alternatively, over a private channel such as a virtual private network (VPN) connection. These and other interfaces (e.g., programmatic interfaces such as APIs) to and/or between components of the systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with system components.

The distributed storage service and database service discussed in FIGS. 2 through 9 provide examples of a distributed data store storing an encrypted data volume for a storage client (e.g., the database) and providing passive distribution of encryption keys to enable access to the encrypted data volume at the distributed storage service. However, various other types of distributed storage systems may be implement, which may not be services, or log-structured, along with other types of storage clients, which may not be databases, such as other services within a service platform or provider network. Therefore, the techniques discussed below may be implemented with regard to many different data stores that store encrypted data on behalf of clients and perform operations to access the encrypted data at the distributed data store in addition to implementing such techniques utilizing the above described services. FIG. 11 is a high-level flowchart illustrating various methods and techniques to implement passive distribution of encryption keys for a distributed data store, according to some embodiments.

Distributed data store 1100 may be any form of distributed storage that utilized distributed system resources to store data in multiple locations. Client 1102 may be any form of client that wishes to enable access to encrypted data stored in distributed data store 1100 to allow the performance of various operations upon the encrypted data at distributed data store 1100. As indicated at 1110, an encrypted data volume may be maintained in a distributed data store across multiple storage nodes. The data may be encrypted according to a single key or a key hierarchy, such as discussed above with regard to FIG. 7. For example, different ranges or portions of the data volume may be differently encrypted.

An encrypted version of key(s) to decrypt the data volume may be provided, by a control plane of the distributed data store, to a client (e.g., client 1102), as indicated at 1120, in various embodiments. As discussed above with regard to FIG. 9, such keys may be provided to the client in response to a request to access the data volume from the client, or may be provided to the client upon the initiative of the control plane (e.g., when the volume is created or when some other event is detected by the control plane). The encrypted key(s) may be generated utilizing an encryption scheme to which the client 1102 does not have access. Therefore, the encrypted version of the keys may be generated in such a way so that client 1102 does not have access to the key(s), but merely possesses them.

As indicated at 1130, the encrypted key(s) may be received from the client to enable access to the data volume, at a storage node. Note that the received key(s) may be particular to a portion of the data volume stored at the storage node. In some embodiments, the received key(s) may be common to group of storage nodes providing a protection group to store the same portion of a data volume at the member nodes of the protection group (e.g., PG key 720 in FIG. 7). Once received, the encrypted keys may be decrypted at the storage node according to another key maintained at the storage node, as indicated at 1140. For example, the storage node may maintain a distribution key which is used by the control plane to encrypt keys sent to clients. In some embodiments, this distribution key may be impermanent, and be rotated at different times. A new distribution key may be obtained by the storage node to decrypt subsequently received encrypted keys. In at least some embodiments, storage nodes may purge all keys decrypted using a previous master key so that clients may have to resend the key(s) for the data volume again encrypted using the new master key.

Figure 12:
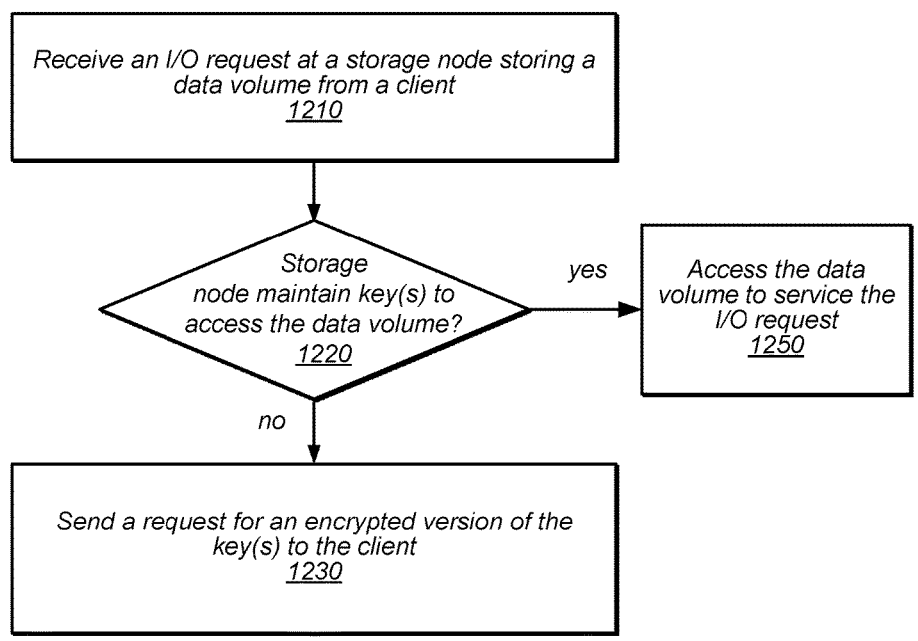
FIG. 12 is a high-level flowchart illustrating various methods and techniques to handle access requests at a storage node of a distributed data store, according to some embodiments.

As indicated at 1150, upon decrypting the key(s), the storage node may enable access to the data volume at the storage node according to the decrypted key(s). For example, the storage node may maintain the decrypted key(s) and memory, retrieving them when it is time to perform an access operation upon the data volume. Some access operations may be instigated by client access requests (e.g., read or write operations to the data volume), while other access operations may be performed to manage the data volume (e.g., compact or reformat data, such as a coalesce operation described above to combine log records for a data page into a new version of the data page). FIG. 12 is a high-level flowchart illustrating various methods and techniques to handle access requests at a storage node of a distributed data store, according to some embodiments.

As indicated at 1210, an I/O request from a client may be received at a storage node storing a data volume. The storage node may determine, as indicated at 1220, whether the appropriate key(s) are maintained to access the data volume identified in the I/O request. If so, as indicated by the positive exit from 1220, then the data volume may be accessed to service the I/O request, as indicated at 1250. If the appropriate key(s) are not maintained, as indicated by the negative exit from 1220, then a request may be sent to the client for an encrypted version of the key(s), as indicated at 1230. In this way, storage nodes may be provided with the appropriate encryption keys when needed.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 13:
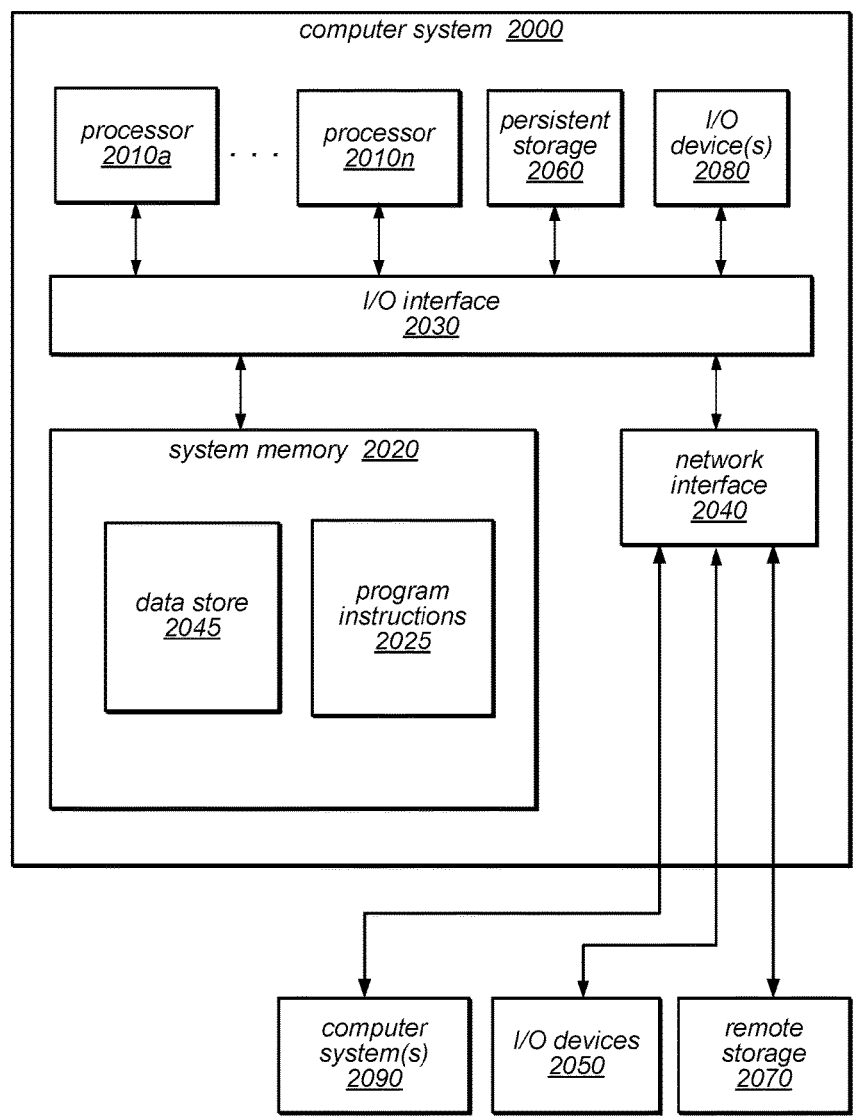
FIG. 13 is an example computer system, according to various embodiments.

FIG. 13 is a block diagram illustrating a computer system configured to implement the distributed data store providing passive distribution of encryption keys, according to various embodiments, as well as various other systems, components, services or devices described above. For example, computer system 2000 may be configured to implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 13 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A system, comprising:
a plurality of compute nodes, respectively comprising at least one processor and a memory, that together implement a distributed storage system;
one or more of the plurality of compute nodes configured to implement a control plane for the distributed storage system;
at least some other compute nodes of the plurality of compute nodes configured to implement a plurality of storage nodes that store encrypted data as part of the distributed storage system on behalf of one or more clients of the distributed storage system;
the control plane, configured to:
generate one or more permanent keys;

encrypt a data volume using the one or more permanent keys and store the data volume in the distributed storage system;

encrypt the one or more permanent keys using a distribution key;

send the encrypted one or more permanent keys from the distributed storage system to a client of the distributed storage system, wherein the one or more permanent keys are encrypted such that the client is unable to access the one or more permanent keys;

individual ones of the plurality of storage nodes that store at least a portion of the data volume, configured to:

receive, by the storage node of the distributed storage system from the client, the encrypted one or more permanent keys to enable access to the portion of the data volume stored at the storage node;

decrypt, by the storage node of the distributed storage system, the one or more permanent keys using the distribution key; and access, by the storage node of the distributed storage system, the portion of the data volume to perform one or more operations, wherein the access utilizes the one or more permanent keys to decrypt the portion of the data volume subsequent to decrypting, by the storage node using the distribution key, the one or more permanent keys received by the distributed storage system from the client in encrypted form;

wherein the distributed storage system is a network-based storage service wherein the client is a network-based database service, and wherein at least one of the one or more operations is performed in response to a read request received from the network-based database service.

2. The system of claim 1, wherein the one or more permanent keys are encrypted and maintained as part of a key hierarchy, and wherein the control plane is further configured to:

prior to the encryption of the one or more permanent keys using the distribution key, initiate decryption of the key hierarchy using a user key to obtain the one or more permanent keys.

3. The system of claim 1, wherein the control plane is further configured to add a new storage node to the plurality of storage nodes that store at least the portion of the data volume, wherein the new storage node provides access to the portion of the data volume using the same one or more permanent keys, wherein the new storage node receives the same one or more permanent keys from the client and wherein the new storage node decrypts the same one or more permanent keys using the distribution key.

4. A method, comprising:

performing, by one or more computing devices:

maintaining an encrypted data volume in a distributed data store across a plurality of storage nodes;

providing, by a control plane of the distributed data store, to a client of the distributed data store an encrypted version of one or more keys to decrypt the data volume, wherein the one or more keys are encrypted such that the client of the distributed data store is unable to access the one or more keys;

receiving, at a storage node of the plurality of storage nodes of the distributed data store, the encrypted one or more keys from the client to enable access to the data volume from the client;

decrypting, by the storage node, the one or more keys using a different key maintained at the storage node; and enabling, at the storage node, access to the data volume using the decrypted one or more keys subsequent to decrypting, by the storage node using the different key, the one or more keys received by the distributed data store from the client in encrypted form;

wherein the distributed data store is a network-based storage service, wherein the client is a network-based database service, and wherein the access is enabled for a read request received from the network-based database service.

5. The method of claim 4, wherein the method further comprises:

generating the one or more keys in response to a request to create the data volume, wherein the one or more keys are permanent keys;

encrypting the one or more keys as a key hierarchy;

wherein providing the encrypted version of one or more keys to decrypt the data volume comprises:

decrypting the one or more keys of the key hierarchy;

encrypting the one or more keys using a distribution key, wherein the different key maintained at the storage node is the distribution key; and sending the encrypted one or more keys to the client.

6. The method of claim 5, wherein a user key is maintained at a key management service separate from the distributed data store and wherein the encrypting of the one or more keys as a key hierarchy comprises sending at least one key of the key hierarchy to the key management service to be encrypted using the user key.

7. The method of claim 5, wherein the data volume comprises a plurality of extents maintained in different protection groups, the protection groups comprising different ones of the plurality of storage nodes, wherein the key hierarchy includes a volume key and respective protection group keys for the protection groups, and wherein encrypting the one or more keys as a key hierarchy comprises:

encrypting the respective protection group keys using the volume key; and encrypting the volume key using a user key.

8. The method of claim 4, further comprising:

receiving, at the storage node, an access request directed to at least a portion of a different data volume maintained at the storage node from another client;

determining, by the storage node, that a permanent key corresponding to the different data volume is not maintained at the storage node; and sending from the storage node a request for the permanent key corresponding to the different data volume to the other client.

9. The method of claim 4, wherein the other key maintained at the storage node is a distribution key;

wherein enabling access to the data volume comprises maintaining the distribution key and the decrypted one or more keys at the storage node in order to perform operations to access the data volume at the storage node utilizing the one or more decrypted keys;

receiving, at the storage node, a new distribution key to replace the distribution key;

in response to receiving the new distribution key, deleting the decrypted one or more keys such that access to the data volume is disabled.

10. The method of claim 4, wherein the storage node is one of a group of storage nodes that implement a protection group for the portion of the data volume, wherein membership of the protection group is modified such that at least one different storage node is added to the protection group, wherein the client detects the modification of the membership of the protection group, and wherein the method further comprises:

performing the receiving, the decrypting, and the enabling for the data volume at the at least one different storage node.

11. The method of claim 4, wherein the client of the distributed data store is a database engine of the network-based database service.

12. The method of claim 4, wherein the distributed data store is a multi-tenant data store, wherein different ones of the plurality of storage nodes store at least a portion of one or more different data volumes maintained in the distributed data store, wherein the different ones of the plurality of storage nodes enable access to at least one of the one or more different data volumes in response to receiving encrypted versions of corresponding keys to decrypt the at least one different data volume at the different storage nodes and decrypting the encrypted versions of the corresponding keys using the different key maintained at the storage node.

13. A non-transitory, computer-readable storage medium, storing program instructions that when executed by one or more computing devices cause the one or more computing devices to implement:

maintaining an encrypted data volume in a distributed data store across a plurality of storage nodes;

encrypting, by a control plane of the distributed data store, one or more permanent keys to decrypt the data volume using a distribution key, wherein the one or more permanent keys are encrypted such that a client of the distributed data store is unable to access the one or more permanent keys;

sending, by the control plane of the distributed data store, to a client of the distributed data store the encrypted one or more permanent keys;

receiving, at a storage node of the plurality of storage nodes of the distributed data store, the encrypted one or more permanent keys from the client to enable access to the data volume;

decrypting, by the storage node, the one or more permanent keys using the distribution key maintained at the storage node; and enabling, at the storage node, access to the data volume using the decrypted one or more permanent keys subsequent to decrypting, by the storage node using the distribution key, the one or more keys permanent keys received by the distributed data store from the client in encrypted form;

wherein the distributed data store is a network-based storage service, wherein the client is a network-based database service, and wherein the access is enabled for a read request received from the network-based database service.

14. The non-transitory, computer-readable storage medium of claim 13, wherein the program instructions cause the one or more computing devices to further implement:

generating the one or more permanent keys in response to a request to create the data volume received at the control plane, wherein the request includes a user key identifier;

encrypting the one or more permanent keys as a key hierarchy, wherein a user key corresponding to the user key identifier is used to encrypt at least one of the permanent keys; and in response to receiving a request to enable access to the data volume from the client at the control plane:

decrypting the one or more permanent keys of the key hierarchy, wherein the user key is used to decrypt at least one of the permanent keys; and performing the encrypting of the one or more permanent keys using the distribution key and the sending of the encrypted one or more permanent keys.

15. The non-transitory, computer-readable storage medium of claim 14, wherein the program instructions cause the one or more computing devices to further implement:

receiving, at the storage node, a new distribution key to replace the distribution key;

in response to receiving the new distribution key, deleting the decrypted one or more permanent keys such that access to the data volume is disabled.

16. The non-transitory, computer-readable storage medium of claim 15, wherein the program instructions cause the one or more computing devices to further implement:

receiving, at the storage node, an access request from the client for the data volume;

in response to determining that access to the data volume is disabled at the storage node, sending, from the storage, a request for the one or more permanent keys to the client;

receiving a new encrypted version of the one or more permanent keys from the client;

decrypting the new encrypted version of the one or more permanent keys using the new distribution key; and enabling at the storage node, access to the data volume using the decryption of the one or more permanent keys using the new distribution key.

17. The non-transitory, computer-readable storage medium of claim 13, wherein the one or more permanent keys is a protection group key specific to a protection group of which the storage node is a member for a portion of the data volume, wherein a different storage node of the plurality of storage nodes storing a different portion of the data volume as part of a different protection group receives a different protection group key from the client to enable access to the data volume at the different storage node, and wherein the different storage node performs the decrypting of the different protection group key using the distribution key and performs the enabling of access to the data volume using the decrypted different protection group key.

18. The non-transitory, computer-readable storage medium of claim 13, wherein the one or more permanent keys are maintained in system memory.

19. The non-transitory, computer-readable storage medium of claim 13, wherein the network-based storage service is a network-based log-structured storage service implemented as part of a network-based services platform and wherein the network-based database service is a different service implemented as part of the network-based services platform.

* * * * *